(12) United States Patent
Maekawa

(10) Patent No.: US 6,364,943 B1
(45) Date of Patent: Apr. 2, 2002

(54) GAS TREATMENT SYSTEM

(75) Inventor: Teisuke Maekawa, Shinjuku-ku (JP)

(73) Assignee: Taikisha Ltd. (JP)

( * ) Notice: Subject to any disclaimer, the term of this patent is extended or adjusted under 35 U.S.C. 154(b) by 0 days.

(21) Appl. No.: 09/632,177

(22) Filed: Aug. 3, 2000

(30) Foreign Application Priority Data

Aug. 4, 1999 (JP) .......................................... 11-221335

(51) Int. Cl.[7] .............................................. B01D 53/06
(52) U.S. Cl. ............................ 96/123; 96/125; 96/127; 96/130; 96/143; 96/150
(58) Field of Search ............................. 96/122–127, 130, 96/143, 145, 150

(56) References Cited

U.S. PATENT DOCUMENTS

| | | | |
|---|---|---|---|
| 2,747,681 A | * 5/1956 | Schuftan et al. | 96/122 |
| 4,257,783 A | * 3/1981 | Gutjahr et al. | 96/145 X |
| 4,846,855 A | * 7/1989 | Tsujimoto | 96/123 X |
| 4,869,734 A | * 9/1989 | Jacquish | 96/150 X |
| 4,946,479 A | * 8/1990 | Izumo | 96/123 |
| 5,464,468 A | * 11/1995 | Tanaka et al. | 96/125 |
| 5,681,369 A | * 10/1997 | Osborne | 96/122 X |
| 5,908,490 A | * 6/1999 | Akamatsu et al. | 96/122 X |

FOREIGN PATENT DOCUMENTS

| | | |
|---|---|---|
| JP | 5322541 | 3/1978 |
| JP | 6010772 | 1/1985 |
| JP | 0466605 | 3/1992 |
| JP | 6226029 | 2/1993 |
| JP | 0938445 | 2/1997 |
| JP | 1157372 | 3/1999 |

* cited by examiner

*Primary Examiner*—Robert H. Spitzer
(74) *Attorney, Agent, or Firm*—Webb Ziesenheim Logsdon Orkin & Hanson, P.C.

(57) ABSTRACT

A gas treatment system for separating and eliminating gaseous hydrocarbon from treatment-object gas exhausted from, for example, a factory is disclosed. The system includes a rotary adsorbing-desorbing concentration device including a gas-permeable adsorbing rotor having adsorbent as a main component thereof, the rotor having in a rotational region thereof an adsorbing area for allowing passage of treatment-object gas containing gaseous hydrocarbon through a rotor portion corresponding thereto and a desorbing area for allowing passage of desorbing-concentrating gas through a rotor portion corresponding thereto, the adsorbing area and the desorbing area being arranged side by side and separated from each other along a rotational direction of the rotor, an adsorbing-desorbing recovery device for selectively effecting an adsorbing process for causing the desorbing-concentrating gas past the desorbing area to pass an adsorbent layer and a desorbing process for causing desorbing-recovering gas to pass the adsorbent layer, and a condensing recovery device for cooling adsorbing-recovering gas past the adsorbent layer so as to condense the gaseous hydrocarbon contained therein and then separating and recovering this condensed hydrocarbon from the gas. In this system, a desorbing-concentrating gas return passage is provided for returning desorbing-concentrating gas past the adsorbent layer after the desorbing layer to cause this desorbing-concentrating gas together with the treatment-object gas to pass the adsorbing area.

6 Claims, 4 Drawing Sheets

US 6,364,943 B1

GAS TREATMENT SYSTEM

BACKGROUND OF THE INVENTION

1. Technical Field of the Invention

The present invention relates to a gas treatment system for use in separating and recovering gaseous hydrocarbon (e.g., vapor of toluene, xylene, or the like employed as a solvent) contained in a treatment-object gas such as factory exhaust gas. More particularly (see FIG. 4), the invention relates to a gas treatment system comprising: a rotary adsorbing-desorbing concentration device 1 including a gas-permeable adsorbing rotor 4 having adsorbent as a main component thereof, the rotor 4 having in a rotational region thereof an adsorbing area x for allowing passage of treatment-object gas A containing gaseous hydrocarbon through a rotor portion corresponding thereto and a desorbing area y for allowing passage of desorbing-concentrating gas B through a rotor portion corresponding thereto, the adsorbing area and the desorbing area being arranged side by side and separated from each other along a rotational direction of the rotor;

an adsorbing-desorbing recovery device 2 for selectively effecting an adsorbing process for causing the desorbing-concentrating gas B' past the desorbing area y to pass an adsorbent layer 9 and a desorbing process for causing desorbing-recovering gas C to pass the adsorbent layer 9; and a condensing recovery device 3 for cooling adsorbing-recovering gas C' past the adsorbing layer 9 so as to condense the gaseous hydrocarbon contained therein and then separating and recovering this condensed hydrocarbon from the gas.

2. Description of the Related Art

Conventionally, with a gas treatment system of the above-noted type, as shown in FIG. 4, the desorbing-concentrating gas B" which has adsorbed and separated the hydrocarbon from the treatment-object gas A from the rotary adsorbing-desorbing concentration device 1 in the course of passage thereof through the adsorbent layer 9 (the layer 9 shown on the right-hand side in FIG. 4) engaged in the adsorbing process at the adsorbing-desorbing recovery device 2 is directly discharged into the atmosphere together with the treated treatment-object gas A' discharged from the adsorbing area x of the rotary adsorbing-desorbing concentration device 1 (see Japanese published patent gazette No. Sho. 60-10772).

Regarding the adsorbing-recovering gas C" (the gas which has condensed the desorbed hydrocarbon from the adsorbent layer 9 and separated and eliminated it) which has passed the condensing recovery device 3 subsequent its passage through the adsorbent layer 9 (the other layer 9 shown on the left-hand side in FIG. 4) engaged in the desorbing process of the adsorbing-desorbing recovery device 2, there have been proposed various types of adsorbing-desorbing recovery devices designed to return this gas to the adsorbing adsorbent layer 9 (i.e., the adsorbent layer currently engaged in the adsorbing process) (for instance, Japanese laid-open patent gazette No. Hei. 11-57372; Japanese laid-open patent gazette No. Hei. 9-38445; Japanese laid-open patent gazette No. Hei. 6-226029; Japanese published patent gazette No. Hei. 4-66605; and Japanese published patent gazette No. Sho. 53-22541).

Further, for this returning of the desorbing-recovering gas C" past the condensing device back to the adsorbing adsorbent layer 9, there is also known an adsorbing-desorbing recovery device including a recycling passage for recycling the desorbing-recovering gas C' past the desorbing adsorbent layer 9 again to the same desorbing adsorbent layer 9 and returning a portion of the desorbing-recovering gas taken off this recycling passage back to the adsorbing adsorbent layer 9 via the condensing recovery device 3 (e.g., see Japanese laid-open patent gazette No. Hei. 9-38445 and Japanese laid-open patent gazette No. Hei. 6-226029).

However, in order to reduce the concentration of the hydrocarbon contained in the adsorbing-concentrating gas B' (concentrating gas) caused to contain the gaseous hydrocarbon in the course of its passage through the desorbing area y of the rotary adsorbing-desorbing concentration device 1 to a level low enough for the gas to be discharged directly into the atmosphere by means of passage through the adsorbing adsorbent layer 9 of the adsorbing-desorbing recovery device 2, a significantly high treatment efficiency is required of this adsorbing-desorbing recovery device 2. Specifically, the adsorbing-desorbing recovery device 2 needs a large amount of adsorbent, which makes it difficult to form this device compact. Moreover, a significantly high temperature (e.g., high temperature which can not be obtained with a typical steam heat source) is needed for the desorbing process to be effected in the adsorbing-desorbing recovery device 2, which leads to high energy consumption. In addition, such high desorbing temperature disadvantageously promotes degradation of the adsorbent and tends to invite unwanted change in the quality of hydrocarbon, such as a solvent, to be recovered.

Further, as described also hereinbefore, if it is attempted to elevate the cooling temperature needed by the condensing recovery device 3 (to elevate up to substantially the room temperature) by returning the desorbing-recovering gas C" past this condensing device 3 back to the adsorbing adsorbent layer 9 (in other words, by allowing un-condensed gaseous hydrocarbon to remain at a certain high concentration in the desorbing-recovering gas C" past the condensing device), there exists a limit in possible elevation of the temperature if the hydrocarbon concentration of the desorbing-concentrating gas B" past the adsorbing adsorbent layer 9 together with the desorbing-recovering gas C" past the condensing device is to be maintained low enough for allowing its discharge into the atmosphere. Hence, the condensing recovery device 3 needs sufficiently low temperature for cooling the gas. In this regard too, the energy consumption is increased disadvantageously.

In view of the above-described state of the art, a primary object of the present invention is to achieve compactness of the system and reduction in energy consumption thereof while retaining high recovery efficiency of the gaseous hydrocarbon by means of reasonable improvement enabling more efficient use of the rotary adsorbing-desorbing concentration device of the system.

SUMMARY OF THE INVENTION

For accomplishing the above-noted object, according to the present invention (see FIG. 1 or FIG. 3), a gas treatment system comprises:

a rotary adsorbing-desorbing concentration device 1 including a gas-permeable adsorbing rotor 4 having adsorbent as a main component thereof, the rotor 4 having in a rotational region thereof an adsorbing area x for allowing passage of treatment-object gas A containing gaseous hydrocarbon through a rotor portion corresponding thereto and a desorbing area y for allowing passage of desorbing-concentrating gas B through a rotor portion corresponding thereto, the adsorbing area and the desorbing area being arranged side by side and separated from each other along a rotational direction of the rotor;

an adsorbing-desorbing recovery device 2 for selectively effecting an adsorbing process for causing the desorbing-concentrating gas B' past the desorbing area y to pass an adsorbent layer 9 and a desorbing process for causing desorbing-recovering gas C to pass the adsorbent layer 9; and a condensing recovery device 3 for cooling adsorbing-recovering gas C' past the adsorbent layer 9 so as to condense the gaseous hydrocarbon contained therein and then separating and recovering this condensed hydrocarbon from the gas;

wherein the system further comprises a desorbing-concentrating gas return passage 12 for returning desorbing-concentrating gas B" past the adsorbent layer 9 after the desorbing layer y to cause this desorbing-concentrating gas B" together with the treatment-object gas A to pass the adsorbing area x.

That is, according to the above construction (see FIG. 1 or FIG. 3), the desorbing-concentrating gas B" (i.e., the gas which has adsorbed and separated the hydrocarbon from the treatment-object gas A in the course of its passage through the adsorbent layer 9) past the adsorbing adsorbent layer 9 of the adsorbing-desorbing recovery device 2 subsequent to its passage through the desorbing area y of the rotary adsorbing-desorbing concentration device 1 is not directly discharged into the atmosphere. Instead, the desorbing-concentrating gas B" is returned via the desorbing-concentrating gas return passage 12 back to the adsorbing area x of the rotary adsorbing-desorbing concentration device 1 together with the treatment-object gas A which is greater in amount than the gas B", such that both the gaseous hydrocarbon remaining within the returned desorbing-concentrating gas B" and the gaseous hydrocarbon contained in the large amount of new treatment-object gas A are adsorbed and separated in the course of passage through the adsorbing area x of the rotary adsorbing-desorbing concentration device 1 (more particularly, during the passage through the rotor at its adsorbing area x), and this mixture gas after the treatment is discharged as treated treatment-object gas A' into the atmosphere.

Therefore, the adsorbing-desorbing recovery device 2 needs not to reduce the hydrocarbon concentration of the desorbing-concentrating gas B' (concentrating gas) sent from the desorbing area y of the rotary adsorbing-desorbing concentration device 1 to the adsorbing adsorbent layer 9 to a level low enough to allow its direct discharge into the atmosphere. For this reason, it becomes possible to reduce the treatment efficiency or capacity required of the adsorbing-desorbing recovery device 2 and hence to reduce the amount of adsorbent used in this device 2, in comparison with the conventional systems described hereinbefore. Further, it becomes also possible to reduce the temperature needed for the desorption effected by this adsorbing-desorbing recovery device 2 (e.g., to a temperature below approximately 130° C.), so that it becomes possible to employ with such conventional heat source as steam, electric heat or the like for this desorbing process.

Incidentally, even when the hydrocarbon concentration of the treatment-object gas A slightly varies and the amount of the adsorbent used therein is fixed, the rotary adsorbing-desorbing device 1 is capable of maintaining the concentration of the hydrocarbon remaining in the treated treatment-object gas A' fed from the adsorbing area x as long as the amount of the treatment-object gas does not vary significantly, provided that its operational condition is appropriately adjusted by, for example, adjusting the rotational speed of its rotor to an optimum condition suited for a particular hydrocarbon concentration which is then present. For this reason, when the desorbing-concentrating gas B" sent from the adsorbing-desorbing recovery device 2 with its treatment efficiency reduced as described above (i.e., a small amount of gas still having high concentration of hydrocarbon) is caused to pass the adsorbing area x of the rotary adsorbing-desorbing concentration device 1 together with the large amount of treatment-object gas A, the concentration of the hydrocarbon remaining in the treated gas A' obtained from its adsorbing area x may be maintained substantially as low as the concentration of hydrocarbon that would be achieved if the treatment-object gas A alone were caused to pass the adsorbing area x (i.e., low value allowing gas discharge into the atmosphere).

For the reasons described above, according to the present invention it has become possible to achieve compactness of the system and reduction in energy consumption while retaining high recovery efficiency of the gaseous hydrocarbon, as compared with the conventional systems. Moreover, it has become also possible to reduce the desorbing temperature, thus restricting degradation in the quality of adsorbent, improving the service life of the system and promoting the recovery efficiency of the hydrocarbon with effective prevention of unfavorable change in the quality of hydrocarbon to be recovered.

According to the present invention (see FIG. 1), the above-described system according to the invention may further comprise: a desorbing-recovering gas recycling passage 16 for returning the desorbing-recovering gas C' past the desorbing adsorbent layer 9 back to the desorbing adsorbent layer 9 causing it to pass again the layer 9; and a desorbing-recovering gas return passage 19 for taking off from the desorbing-recovering gas recycling passage 16 an amount of the desorbing-recovering gas C' corresponding to an amount of fresh desorbing-recovering gas Ci to be newly supplemented to this desorbing-recovering gas recycling passage 16 and then returning this taken-off desorbing-recovering gas Cr via the concentrating device 3 back to the adsorbing adsorbent layer 9 for causing the taken-off desorbing-recovering gas Cr to pass the adsorbing adsorbent layer 9 together with the desorbing-concentrating gas B' past the desorbing area y.

That is to say, according to the above-described construction (see FIG. 1), for the purpose of elevating the cooling temperature needed by the condensing recovery device 3 (i.e., elevating it up to substantially the room temperature), the amount of the desorbing-recovering the gas Cr taken off from the desorbing-recovering gas recycling passage 16 is returned via the condensing recovery device 3 back to the adsorbing adsorbent layer 9 of the adsorbing-desorbing recovery device 2 (i.e., a relatively high concentration of un-condensed gaseous hydrocarbon is allowed to remain in the taken-off desorbing-recovering gas Cr past the concentrating device 3). In doing so, the desorbing-concentrating gas B" which has passed the adsorbing adsorbent layer 9 together with the taken-off desorbing-recovering gas Cr past the condensing device is returned via the desorbing-concentrating gas return passage 12 to the adsorbing area x of the rotary adsorbing-desorbing concentration device 1 for its further treatment. Hence, in comparison with the construction in which this desorbing-concentrating gas B" past the adsorbent layer is directly discharged into the atmosphere, the temperature needed for gas cooling process in the condensing recovery device 3 may be further elevated, so that it becomes possible to effect this gas cooling process by using such conventional means as cooling water (so-called room temperature cooling).

For the reasons above, the system may be still superior in energy saving performance, with the additional effect of reduction in the desorbing temperature described above.

Also, in the above construction, the condensing recovery device 3 needs to process only a very small amount of desorbing-recovering gas Cr taken off from the desorbing-recovering gas recycling passage 16 (the amount corresponding to the amount of fresh desorbing-recovering gas Ci to be supplemented to this desorbing-recovering gas recycling passage 16). Therefore, in comparison with a construction in which the entire amount of desorbing-recovering gas C' recycled by the desorbing-recovering gas recycling passage 16 is caused to pass the condensing recovery device 3 to be heated again for solvent desorption after this passage, it is possible to reduce wasteful use of heat due to repetition of cooling and heating cycles, so that a small-capacity and size device may be employed as this condensing recovery device 3.

According to the present invention (see FIG. 3), the above-described system according to the invention may further comprise: a desorbing-recovering gas recycling passage 16 for returning the desorbing-recovering gas C' past the desorbing adsorbent layer 9 back to the desorbing adsorbent layer 9 causing it to pass again the layer 9; and a desorbing-recovering gas return passage 19 for taking off, from a portion of the desorbing-recovering gas recycling passage 16 downstream of the condensing device 3, an amount of the desorbing-recovering gas C' corresponding to an amount of fresh desorbing-recovering gas Ci to be newly supplemented to this desorbing-recovering gas recycling passage 16 and then returning this taken-off desorbing-recovering gas Cr' back to the adsorbing adsorbent layer 9 for causing the taken-off desorbing-recovering gas Cr' together with the desorbing-concentrating gas B' past the desorbing area y to pass the adsorbing adsorbent layer 9.

That is to say, according to the above-described construction (see FIG. 3), for the purpose of elevating the cooling temperature needed by the condensing recovery device 3 (elevating it up to substantially the room temperature), the amount of desorbing-recovering gas Cr' taken off from a portion of the desorbing-recovering gas recycling passage 16 downstream of the condensing device 3 is returned back to the adsorbing adsorbent layer 9 of the adsorbing-desorbing recovery device 2 (i.e., a relatively high concentration of un-condensed gaseous hydrocarbon is allowed to remain in the taken-off desorbing-recovering gas Cr' past the condensing device 3). In doing so, the desorbing-concentrating gas B" which has passed the adsorbing adsorbent layer 9 together with the taken-off desorbing-recovering gas Cr' past the condensing device 3 is returned via the desorbing-concentrating gas return passage 12 to the adsorbing area x of the rotary adsorbing-desorbing concentration device 1 for its further treatment. Further, as the treatment efficiency of the adsorbing-desorbing recovery device 2 may be reduced for allowing a higher concentration of the un-condensed hydrocarbon in the desorbing-recovering gas C to be recycled to the desorbing adsorbent layer 9 subsequent its passage through the condensing device 3, the temperature needed for the gas cooling process at the condensing recovery device 3 may be further elevated, in comparison with the case of directly discharging the desorbing-concentrating gas B" past the adsorbent layer into the atmosphere, so that this gas cooling process may be effected by using such conventional means as cooling water (so-called room temperature cooling).

For the reasons above, this system like the above-described system, may be still superior in energy saving performance, with the additional effect of reduction in the desorbing temperature.

Also, in the above construction, the desorbing-recovering gas C whose hydrocarbon concentration has been reduced in the course of its passage through the condensing recovery device 3 is returned to the desorbing adsorbent layer 9 for desorption, the desorption efficiency of the adsorbing-desorbing recovery device 2 may be improved.

According to the present invention (see FIG. 1 or FIG. 3), in the system according to any one of the above-described systems the hydrocarbon concentration of the desorbing-concentrating gas B" to be returned to the adsorbing area x via the desorbing-concentrating gas return passage 12 is set approximately equal to or higher than the hydrocarbon concentration of the treatment-object gas A.

That is to say, with such setting of the hydrocarbon concentration of the desorbing-concentrating gas B" past the adsorbing adsorbent layer 9 to be equal to or higher than the hydrocarbon concentration of the treatment-object gas A, and by returning this desorbing-concentrating gas B" having same or higher concentration of hydrocarbon as or than the treatment-object gas A via the desorbing-concentrating gas return passage 12 to the adsorbing area x of the rotary adsorbing-desorbing concentration device 1, the treatment efficiency required of the adsorbing-desorbing recovery device 2 may be further reduced, in comparison with the case where desorbing-concentrating gas B" having lower hydrocarbon concentration than the treatment-object gas A is returned to the adsorbing area x. Further, when this construction is implemented in the system according to section [2] or [3] above the cooling temperature needed at the adsorbing-desorbing recovery device 2 may be further elevated, so that the effects of the invention may be achieved more conspicuously. Hence, the advantageous reduction in the system size and energy consumption may be achieved more effectively.

Further and other features and effects of the invention will become apparent upon reading the following description of the preferred embodiments thereof with reference to the accompanying drawings.

DESCRIPTION OF THE PREFERRED EMBODIMENTS

Preferred embodiments of the present invention will be described next with reference to the accompanying drawings.

Figure 1:
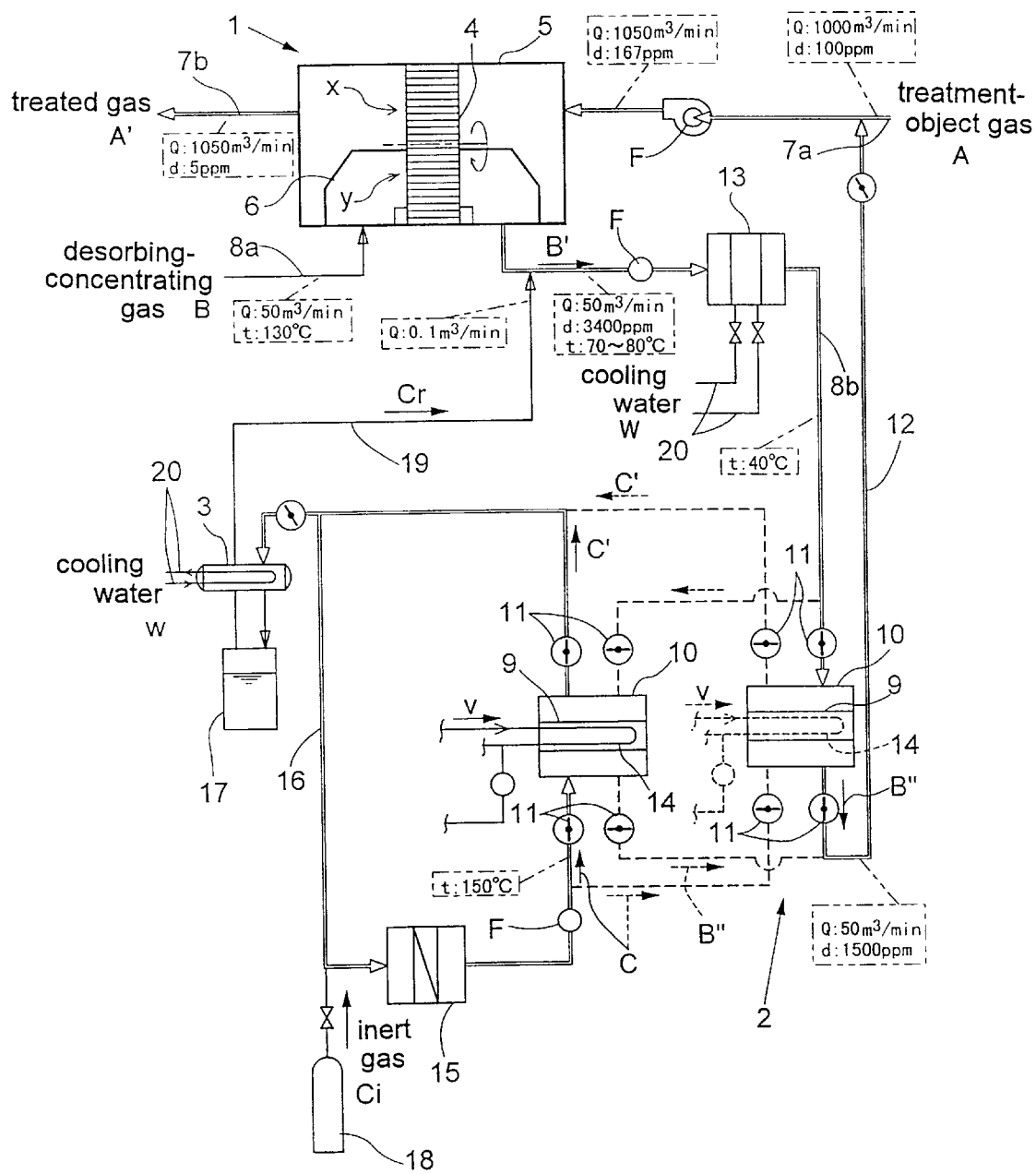
FIG. 1 is a schematic view showing construction of a gas treatment system relating to one preferred embodiment of the present invention.

FIG. 1 is a gas treatment system for separating and recovering solvent vapor (gaseous hydrocarbon) contained in an exhaust gas as a treatment-object gas generated in, for example, a painting factory, printing factory or semiconductor electronic component manufacturing factory, etc. The system includes a rotary adsorbing-desorbing device concentration device 1, a tower-switching type adsorbing-desorbing recovery device 2, and a condensing recovery device 3.

Figure 2:
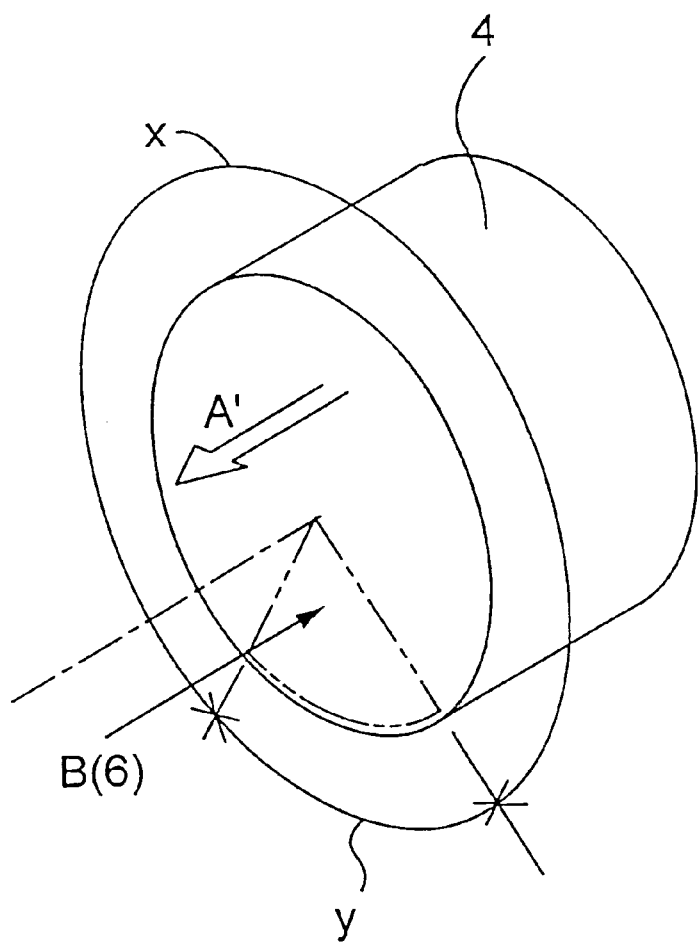
FIG. 2 is a schematic perspective view of a rotor portion.

The rotary adsorbing-desorbing concentration device 1 includes a disc-like adsorbing rotor 4, for example, consisting mainly of honeycomb elements formed of adsorbent material. More particularly, as shown in FIGS. 1 and 2, inside a casing 5 housing the adsorbing rotor 4 therein, an inner-dividing duct 6 is provided to extend across a rotational region of the adsorbing rotor 4, so that along the rotational area of the adsorbing rotor 4 there are formed an adsorbing area x for allowing treatment-object gas A introduced into the casing 5 to pass a corresponding rotor portion and a desorbing area y for allowing desorbing-concentrating gas B introduced into the inner-dividing duct 6 to pass a further corresponding portion of the rotor, with the areas x, y being juxtaposed with each other along the rotational direction of the rotor. Then, with rotation of the adsorbing rotor 4, the respective portions of this rotor 4 are caused to pass the adsorbing area x and the desorbing area y alternately.

Namely, in this rotary adsorbing-desorbing concentration device 1, in the course of the passage of the treatment-object gas A introduced from a treatment-object gas inlet passage 7a into the casing 5, the solvent vapor contained in this treatment-object gas A is adsorbed and separated by the adsorbent attached to the rotor portion which is now passing the adsorbing area; and in the course of the passage of the high-temperature desorbing-recovering gas B introduced from a desorbing-concentrating gas inlet passage 8a into the inner-dividing duct 6, the solvent vapor which was adsorbed during the foregoing passage through the adsorbing area passage is desorbed from the rotor portion, which is now passing the desorbing area, into the desorbing-concentrating gas B. Hence, with rotation of the adsorbing rotor 4, the device 1 effects a continuous concentrating process for gradually increasing the concentration of the solvent vapor through continuous transfer of the solvent vapor from the large amount of treatment-object gas A into the small amount of desorbing-concentrating gas B.

Though not shown, on the downstream side of the desorbing area y in the rotational direction of the rotor (i.e., on the upstream side of the adsorbing area x in the rotational direction of the rotor) and between the desorbing area y and the adsorbing area x, there is formed a cooling area for allowing passage of a cooling gas through a corresponding rotor portion for enhancing the efficiency of adsorption to be effected subsequently in the adsorbing area x.

Treated treatment-object gas A' which has its solvent vapor eliminated in the course of its passage through the adsorbing area x and thus has its solvent vapor concentration lowered enough for allowing discharge into the atmosphere is guided from the inside of the casing 5 and then discharged through a treatment-object gas outlet passage 7b into the atmosphere. On the other hand, the desorbing-concentrating gas B' (concentrating gas) which now contains the solvent vapor in the course of its passage through the desorbing area y is guided from the inner-dividing duct 6 through a desorbing-concentrating gas outlet passage 8b to be sent to the tower-switching type adsorbing-desorbing recovery device 2.

This tower-switching type adsorbing-desorbing recovery device 2 includes a plurality of adsorbing towers 10 each incorporating therein a stationary adsorbent layer 9 having gas-permeability and a corresponding plurality of damper units 11 connected with the respective towers 10. With opening/closing the damper unit 11 associated therewith, each adsorbing tower 10 may selectively be engaged in an adsorbing process in which the desorbing-concentrating gas B' (concentrating gas) sent from the rotary adsorbing-desorbing concentration device 1 through the desorbing-concentrating gas outlet passage 8b is caused to pass the adsorbent layer 9 incorporated within this tower 10 and a desorbing process in which the desorbing-recovering gas C is caused to pass this adsorbent layer 9 for desorbing the solvent vapor which was adsorbed on this absorbent layer 9 in the foregoing adsorbing process.

With this tower-switching type adsorbing-desorbing recovery device 2, the device effects the adsorbing process and the desorbing process continuously and in parallel manner by engaging some of the plurality of adsorbing towers 10 in the adsorbing process while engaging the others in the desorbing process. With these adsorbing and desorbing processes, the solvent vapor is transferred from the desorbing-concentrating gas B' (concentrating gas) fed from the rotary adsorbing-desorbing concentration device 1 into the desorbing-recovering gas C which is even smaller in amount than the gas B', so that the concentration of the solvent vapor is increased up to a level which allows recovery of the solvent through cooling condensing process to be effected subsequently by the condensing recovery device 3.

Referring further to the tower-switching type adsorbing-desorbing recovery device 2 shown in the drawings, the solid-line arrows indicate the gas flows when the adsorbing tower 10 shown on the right-hand side is engaged in the adsorbing process and the adsorbing tower 10 shown on the left-had side is engaged in the desorbing process. Whereas, the broken-line arrows indicate the gas flows when the left-hand adsorbing tower 10 is engaged in the adsorbing process and the right-hand adsorbing tower 10 is engaged in the desorbing process.

Numeral 12 denotes a desorbing-concentrating gas return passage for causing the desorbing-concentrating gas B" past the adsorbing adsorbent layer 9 of the tower-switching type adsorbing-desorbing recovery device 2 to be combined with the treatment-object gas A in the treatment-object gas inlet passage 7a and for then causing the mixture of these gases A, B" to pass the adsorbing area x of the rotary adsorbing-desorbing concentration device 1. In this manner, as the desorbing-concentrating gas B" past the adsorbing adsorbent layer 9 of the tower-switching type adsorbing-desorbing recovery device 2 is returned back to the adsorbing area x of the rotary adsorbing-desorbing concentration device 1 together with the large amount of treatment-object gas A. The solvent vapor remaining in this returned desorbing-concentrating gas B" (in this embodiment, gas having a solvent vapor concentration as high as or higher than the treatment-object gas A) is adsorbed and separated, together with the solvent vapor contained in the large amount of treatment-object gas A, in the course of passage through the adsorbing area x of the rotary adsorbing-desorbing concentration device 1, and the mixture gas of these gases after this adsorbing treatment is discharged into the atmosphere as treated treatment-object gas A'.

By returning the desorbing-concentrating gas B" past the adsorbing adsorbent layer 9 of the tower-switching type adsorbing-desorbing recovery device 2, it is possible to reduce the treatment efficiency required of the tower-switching type adsorbing-desorbing recovery device 2, thus allowing this device 2 to be formed compact due to reduction in the required amount of adsorbent used therein and allowing also reduction in the temperature needed for the desorbing process effected by the device 2.

As for the rotary adsorbing-desorbing concentration device 1, by appropriately setting the rotational speed of the adsorbent rotor 4 in accordance with the solvent vapor concentration of the mixture gas of the treatment-object gas A introduced from the treatment-object gas inlet passage 7a and the desorbing-concentrating gas B" (the gas past the adsorbing adsorbent layer 9), the device is adapted for obtaining maximum treatment efficiency for such particular solvent vapor concentration of the mixture gas, whereby the device may provide substantially the same processing efficiency as that would have been provided when only the treatment-object gas A alone were processed by the same amount of adsorbent.

Numeral 13 denotes a cooler for cooling the desorbing-concentrating gas B' to be fed to the adsorbing adsorbent layer 9 via the desorbing-concentrating gas outlet passage 8b subsequent to its passage through the desorbing area y. Mark F denotes fans.

Numeral 14 denotes a heater for heating the desorbing adsorbent layer 9 (i.e., the adsorbent layer engaged in the desorbing process) by passing water vapor v through a heat-exchanger tube disposed within the adsorbent layer 9. Numeral 15 denotes another heater for heating the desorbing-recovering gas C to be passed through the desorbing adsorbent layer 9. With heating of the adsorbent layer and the gas by these heaters 14, 15, the solvent vapor is desorbed from the desorbing adsorbent layer 9.

Numeral 16 denotes a desorbing-recovering gas recycling passage for recycling the desorbing-recovering gas C' past the desorbing adsorbent layer 9 back to the desorbing adsorbent layer 9 (i.e., recycled to the adsorbent layer 9 engaged in the desorbing process). This desorbing-recovering gas recycling passage 16 incorporates therein the gas heater 15 described above and is connected to an inert gas feeding unit 18 for feeding and supplementing inert gas (e.g., nitrogen gas) as fresh desorbing-recovering gas Ci into the circuit. That is, with this gas treatment system, the inert gas fed from this inert gas feeding unit 18 is used as desorbing-recovering gas C for recovery of the solvent.

Numeral 19 denotes a desorbing-recovering gas return passage for taking off from the desorbing-recovering gas recycling passage 16 an amount of the desorbing-recovering gas C' corresponding to the amount of the fresh desorbing-recovering gas Ci supplemented to this desorbing-recovering gas recycling passage 16, combining the taken-off desorbing-recovering gas Cr with the desorbing-concentrating gas B' of the desorbing-concentrating gas outlet passage 8b and then returning this mixture gas to the adsorbing adsorbent layer 9 of the tower-switching type adsorbing-desorbing recovery device 2 to be passed therethrough. In the course of this, the condensing recovery device 3 incorporated within this desorbing-recovering gas return passage 19 cools the taken-off desorbing-recovering gas Cr (i.e., the desorbing-recovering gas past the desorbing adsorbent layer 9) passing therethrough, so as to condense the solvent vapor contained in a high concentration in this gas and then recovering this condensed solvent in a storage tank 17.

That is to say, the desorbing-recovering gas Cr taken off from the desorbing-recovering gas recycling passage 16 is returned via the concentrating device 3 back to the adsorbing adsorbent layer 9, for causing both this gas Cr and the desorbing-concentrating gas B' (concentrating gas) past the desorbing area y of the concentration rotary type adsorbing-desorbing device 1 to pass the adsorbing adsorbent layer 9. With this, the un-condensed solvent vapor remaining in a high concentration in the taken-off desorbing-recovering gas Cr past the condensing device is adsorbed and eliminated by the adsorbing adsorbent layer 9 of the tower-switching type adsorbing-desorbing recovery device 2 together with the solvent vapor contained in the desorbing-concentrating gas B' past the desorbing area.

Thereafter, desorbing-concentrating gas B" obtained from the adsorbing adsorbent layer 9 after the passage of the gas Cr and the gas B' therethrough is then returned via the desorbing-concentrating gas return passage 12 to the adsorbing area x of the rotary adsorbing-desorbing concentration device 1, for causing this gas B" together with the treatment-object gas A to pass the adsorbing area x.

That is, by the above-described returning arrangement of the amount of taken-off desorbing-recovering gas Cr from the desorbing-recovering gas recycling passage 16, it is possible to elevate the temperature needed for the cooling process at the condensing recovery device 3.

Numeral 20 denotes a cooling-water circuit for feeding, to the condensing recovery device 3 and to the cooler 13, a cooling water w which has been heat-discharged into the atmosphere in a cooling tower (not shown).

Marks Q, d and t employed in FIG. 1 represent an example of the amount of gas, vapor solvent concentration in the gas and the temperature, respectively at the respective portions of the system.

[other embodiments]

Figure 3:
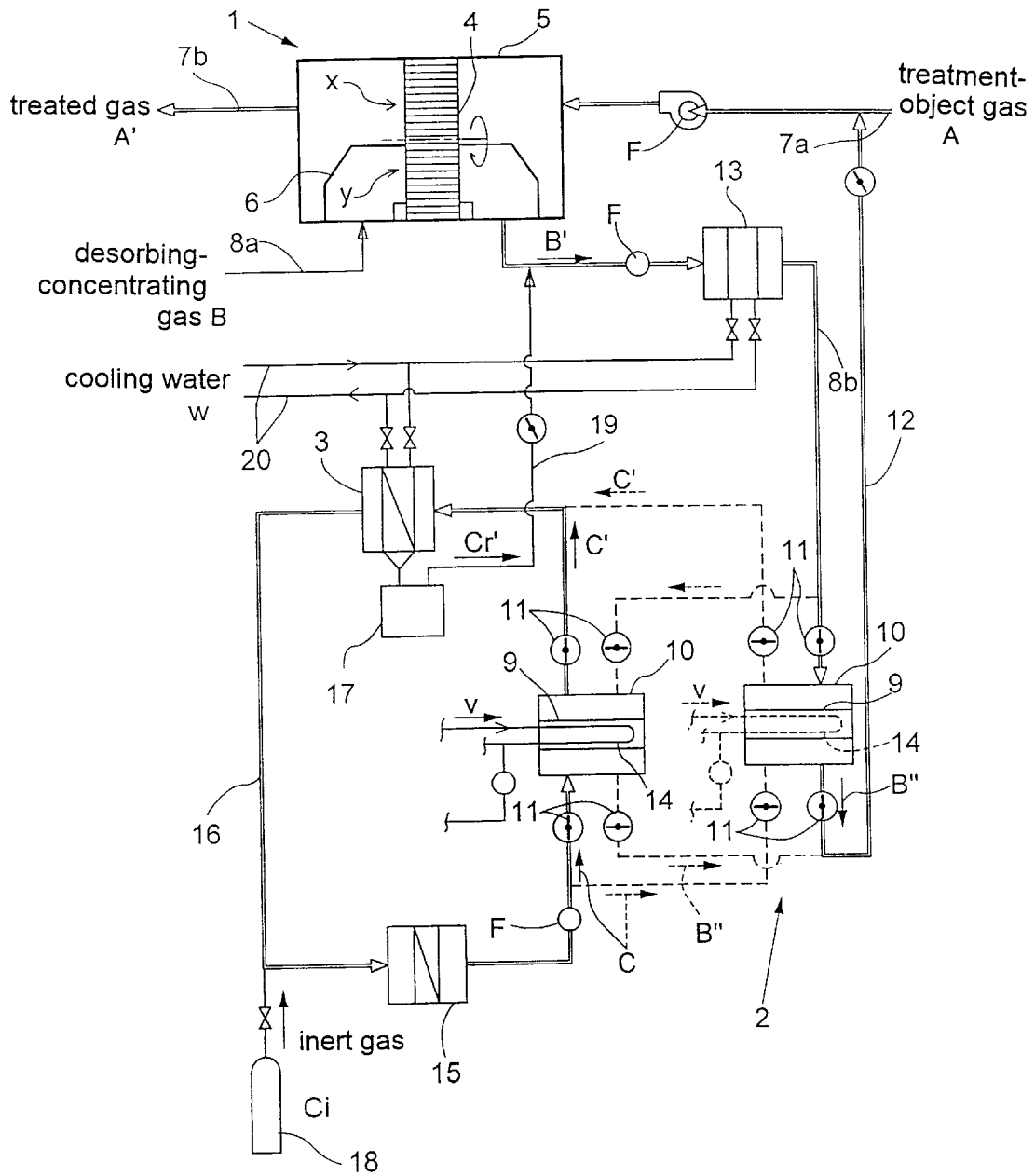
FIG. 3 is a schematic view showing construction of a gas treatment system relating to another preferred embodiment of the present invention.
Figure 4:
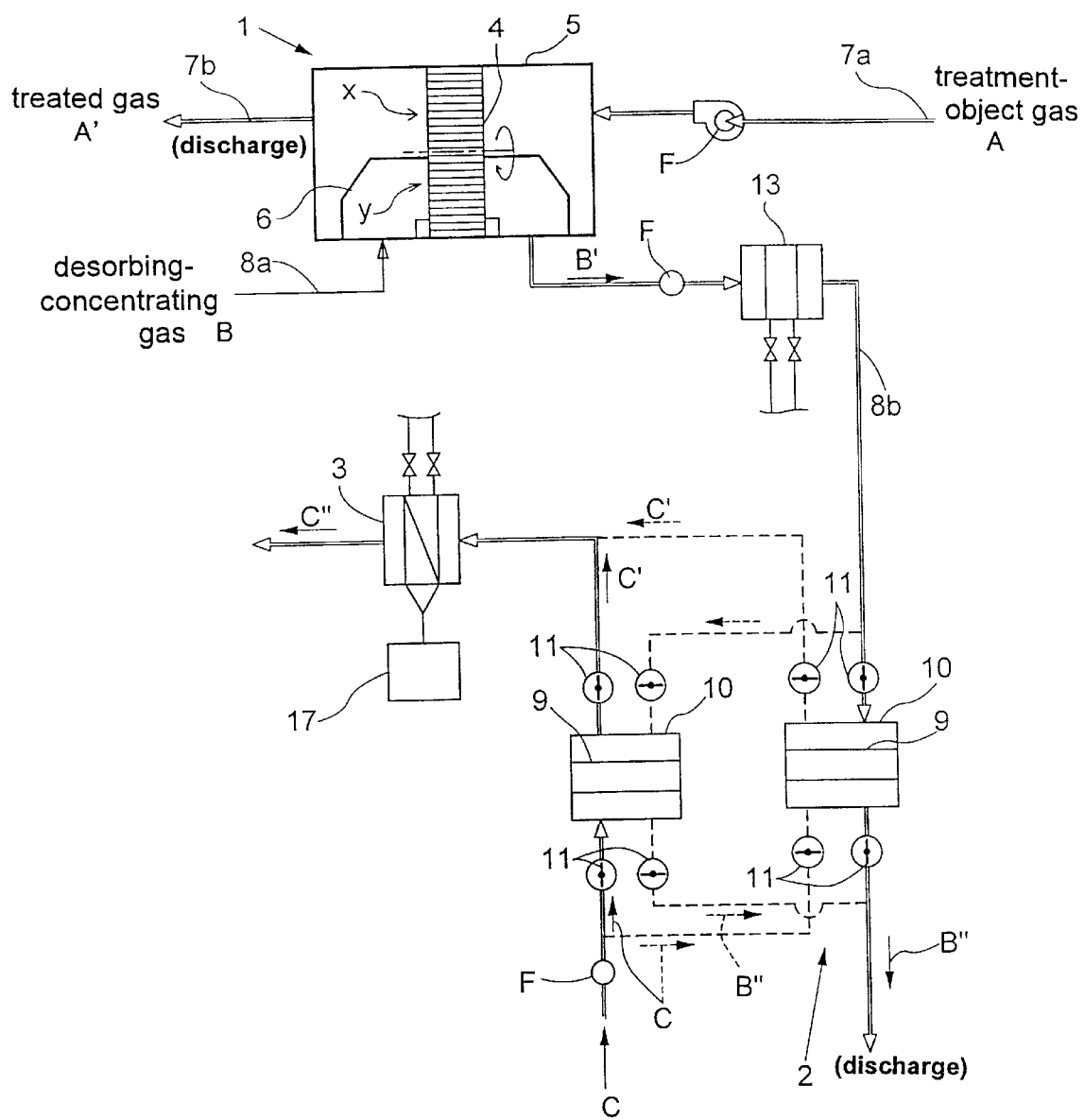
FIG. 4 is a schematic view showing construction of a conventional system.

FIG. 3 shows another gas treatment system which is constructed by partially modifying the system described and shown in the foregoing embodiment. Referring to the differences, in this gas treatment system, the condensing recovery device 3 is incorporated within the desorbing-recovering gas recycling passage 16, so that the entire amount of the desorbing-recovering gas C' circulated in the desorbing-recovering gas recycling passage 16 is caused to pass this condensing device 3. Further, the desorbing-recovering gas return passage 19 is adapted for taking off, from a portion thereof downstream of the condensing device 3, an amount of the desorbing-recovering gas C' corresponding to the amount of fresh desorbing-recovering gas Ci supplemented to this desorbing-recovering gas return passage 16 and then returning this taken-off desorbing-recovering gas Cr' back to the adsorbing adsorbent layer 9, for causing this taken-off desorbing-recovering gas Cr' together with the desorbing-concentrating gas B' past the desorbing area y of the rotary adsorbing-desorbing concentration device 1 to pass this adsorbing adsorbent layer 9.

In the foregoing embodiment, the adsorbing rotor 4 of the rotary adsorbing-desorbing concentration device 1 is a disc-like device for allowing gas passage along the rotational axis thereof. Instead, this rotor may be formed as a cylindrical rotor for allowing gas passage in a direction normal to the rotational axis (the cylinder axis). Further, it may be formed also as an endless belt type which is rotated in circulation between the adsorbing area and the desorbing area. In these manners, the specific construction of the adsorbing rotor 4 may be modified in variety of manners.

In the foregoing embodiment, the adsorbing-desorbing recovery device 2 is provided as the tower-switching type. Instead, depending on the convenience, it may be provided as a rotary type using an adsorbing rotor or may be provided as any other type as well.

In the foregoing embodiment, the heating means provided for the desorbing process at the adsorbing-desorbing recovery device 2 employs vapor (water vapor) as its heat source.

Instead, it may be modified to employ other heat sources such as electricity, combustion gas, etc. Further, in the foregoing embodiment, the condensing recovery device 3 employs cooling water as the gas cooling medium used in its cooling tower. Instead, cold water, brine, or an expandable cooling medium in a heat-pump circuit may be employed for the cooling.

In putting the invention into practice, depending on the convenience, the system may be modified to discharge the amount of taken-off desorbing-recovering gas Cr from the desorbing-recovering gas recycling passage 16 into the atmosphere after its passage through the condensing recovery device 3 or to discharge the amount of taken-off desorbing-recovering gas from the portion of the desorbing-recovering gas recycling passage 16 downstream of the condensing recovery device 3 directly into the atmosphere or to discharge the entire amount of the desorbing-recovering gas Cr' past the desorbing adsorbent layer 9 into the atmosphere after its passage through the condensing recovery device 3. Further, the system may be modified to return the entire amount of the desorbing-recovering gas C' past the desorbing adsorbent layer 9 through the condensing recovery device 3 back to the adsorbing adsorbent layer 9, for causing this gas C' together with the desorbing-concentrating gas B' past the desorbing area y to pass the adsorbing adsorbent layer.

Moreover, in the foregoing embodiment, the amount of taken-off desorbing-recovering gas Cr, Cr' past the condensing recovery device 3 is returned via the desorbing-recovering gas return passage 19 to the adsorbing adsorbent layer 9 of the adsorbing-desorbing recovery device 2, so that this gas Cr, Cr' together with the desorbing-concentrating gas B' past the desorbing area y of the rotary adsorbing-desorbing concentration device 1 is caused to pass the adsorbing adsorbent layer 9 of the adsorbing-desorbing recovery device 2. Instead of this, the amount of taken-off desorbing-recovering gas Cr, Cr' past the condensing recovery device 3 or the entire amount of the desorbing-recovering gas $C^1$ past the condensing recovery device 3 subsequent to the desorbing process may be returned via the return passage 12 to the adsorbing area x of the rotary adsorbing-desorbing concentration device 1, so as to be caused to pass the adsorbing area x of the rotary adsorbing-desorbing concentration device 1 together with the treatment-object gas A and the return gas B" from the desorbing-concentrating gas return passage 12.

The treatment-object gaseous hydrocarbon is not limited to the solvent used in painting, printing or rinsing of semiconductor components. The specific manner or location of generation of the treatment-object gas or the gaseous hydrocarbon component is not particularly limited in the present invention.

Further, the adsorbent (material) may be activated carbon, zeolite or any other kind of material appropriately selected, depending on the type of the treatment-target hydrocarbon.

The gaseous hydrocarbon separated and recovered from the treatment-object gas may be used mainly for the purpose of re-use of hydrocarbon, or cleaning of the treatment-object gas or any other purpose.

The present invention may be modified in any other way than described above without departing the essential spirit thereof defined in the appended claims. It is understood that the foregoing embodiments are disclosed for the sole purpose of illustrating some preferred constructions, not for limiting the scope of the invention.

What is claimed is:

1. A gas treatment system comprising:
   a rotary adsorbing-desorbing concentration device including a gas-permeable adsorbing rotor having adsorbent as a main component thereof, the rotor having in a rotational region thereof an adsorbing area for allowing passage of treatment-object gas containing gaseous hydrocarbon through a rotor portion corresponding thereto and a desorbing area for allowing passage of desorbing-concentrating gas through a rotor portion corresponding thereto, the adsorbing area and the desorbing area being arranged side by side and separated from each other along a rotational direction of the rotor;
   an adsorbing-desorbing recovery device for selectively effecting an adsorbing process for causing the desorbing 15 concentrating gas past the desorbing area to pass an adsorbent layer and a desorbing process for causing desorbing-recovering gas to pass the adsorbent layer; and
   a condensing recovery device for cooling adsorbing-recovering gas past the adsorbent layer so as to condense the gaseous hydrocarbon contained therein and then separating and recovering this condensed hydrocarbon from the gas;
   wherein the system further comprises a desorbing-concentrating gas return passage for returning the desorbing-concentrating gas past the adsorbent layer after the desorbing layer to cause this desorbing-concentrating gas together with the treatment-object gas to pass the adsorbing area.

2. The gas treatment system as defined in claim 1, further comprising:
   a desorbing-recovering gas recycling passage for returning the desorbing-recovering gas past the desorbing adsorbent layer back to the desorbing adsorbent layer causing the desorbing-recovering gas to pass again the adsorbent layer; and
   a desorbing-recovering gas return passage for taking off from the desorbing-recovering gas recycling passage an amount of the desorbing-recovering gas corresponding to an amount of fresh desorbing-recovering gas to be newly supplemented to this desorbing-recovering gas recycling passage and then returning this taken-off desorbing-recovering gas via the condensing device back to the adsorbing adsorbent layer for causing the taken-off desorbing-recovering gas to pass the adsorbing adsorbent layer together with the desorbing-concentrating gas past the desorbing area.

3. The gas treatment system as defined in claim 2, wherein a hydrocarbon concentration of the desorbing-concentrating gas to be returned to the adsorbing area via the desorbing-concentrating gas return passage is set approximately equal to or higher than a hydrocarbon concentration of the treatment-object gas.

4. The gas treatment system as defined in claim 1, further comprising:
   a desorbing-recovering gas recycling passage for returning the desorbing-recovering gas past the desorbing adsorbent layer back to the desorbing adsorbent layer causing the desorbing-recovering gas to pass again the adsorbent layer; and
   a desorbing-recovering gas return passage for taking off, from a portion of the desorbing-recovering gas recycling passage downstream of the condensing device, an amount of desorbing-recovering gas corresponding to an amount of fresh desorbing-recovering gas to be newly supplemented to this desorbing-recovering gas recycling passage and then returning this taken-off desorbing-recovering gas back to the adsorbing adsorbent layer for causing the taken-off desorbing-recovering gas together with the desorbing-concentrating gas past the desorbing area to pass the adsorbing adsorbent layer.

5. The gas treatment system as defined in claim 4, wherein a hydrocarbon concentration of the desorbing-concentrating gas to be returned to the adsorbing area via the desorbing-concentrating gas return passage is set approximately equal to or higher than a hydrocarbon concentration of the treatment-object gas.

6. The gas treatment system as defined in claim 1, wherein a hydrocarbon concentration of the desorbing-concentrating gas to be returned to the adsorbing area via the desorbing-concentrating gas return passage is set approximately equal to or higher than a hydrocarbon concentration of the treatment-object gas.

* * * * *

UNITED STATES PATENT AND TRADEMARK OFFICE
CERTIFICATE OF CORRECTION

PATENT NO. : 6,364,943 B1
DATED : April 2, 2002
INVENTOR(S) : Teisuke Maekawa

It is certified that error appears in the above-identified patent and that said Letters Patent is hereby corrected as shown below:

Column 2,
Line 55, before "For" insert -- [1] --.

Column 4,
Line 28, before "According" insert -- [2] --.
Line 66, after "for" insert -- the --.

Column 5,
Line 22, before "According" insert -- [3] --.

Column 6,
Line 13, before "According" insert -- [4] --.

Column 11,
Line 40, "C1" should read -- C' --.

Column 12,
Lines 15-16, "desorbing 15 concentrating" should read -- desorbing-concentrating --.

Signed and Sealed this

First Day of October, 2002

Attest:

JAMES E. ROGAN
Attesting Officer          Director of the United States Patent and Trademark Office